United States Patent
Sun et al.

(10) Patent No.: US 12,096,365 B2
(45) Date of Patent: Sep. 17, 2024

(54) WAKE-UP SIGNAL FOR DISCONTINUOUS RECEPTION OPERATIONS

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Hongbo Yan, Vista, CA (US); Huaning Niu, San Jose, CA (US); Oghenekome Oteri, San Diego, CA (US); Shengshan Cui, San Diego, CA (US); Sigen Ye, Whitehouse Station, NJ (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 434 days.

(21) Appl. No.: 17/593,597

(22) PCT Filed: Oct. 14, 2020

(86) PCT No.: PCT/CN2020/120856
§ 371 (c)(1),
(2) Date: Sep. 21, 2021

(87) PCT Pub. No.: WO2022/077260
PCT Pub. Date: Apr. 21, 2022

(65) Prior Publication Data
US 2022/0303900 A1 Sep. 22, 2022

(51) Int. Cl.
*H04W 52/00* (2009.01)
*H04L 1/00* (2006.01)
(Continued)

(52) U.S. Cl.
CPC ....... *H04W 52/0232* (2013.01); *H04L 1/0003* (2013.01); *H04W 68/005* (2013.01); *H04W 72/0446* (2013.01); *H04W 72/23* (2023.01)

(58) Field of Classification Search
CPC ............. H04W 52/0232; H04W 72/23; H04W 72/0446; H04W 68/005; H04L 1/0003
See application file for complete search history.

(56) References Cited

U.S. PATENT DOCUMENTS

2020/0029302 A1\* 1/2020 Cox .................. H04W 52/0216
2020/0229092 A1 7/2020 Wu et al.
(Continued)

FOREIGN PATENT DOCUMENTS

| WO | 2019/096704 | 5/2019 |
| WO | 2019/096858 | 5/2019 |
| WO | 2020/160272 | 8/2020 |

*Primary Examiner* — Erika A Washington
(74) *Attorney, Agent, or Firm* — Fay Kaplun & Marcin, LLP (57) ABSTRACT

A wake up signal scheme between a network and a user equipment (UE) operating in a Discontinuous Reception (DRX) state. The UE monitors a wake up signal (WUS) occasion to determine whether a WUS is received during the WUS occasion, when the WUS is received, determines whether the WUS identifies the UE, when the WUS is received and identifies the UE, monitors an OnDuration of a Discontinuous Reception (DRX) cycle corresponding to the WUS and when the WUS is not received or the WUS does not identify the UE, remains in a sleep state during the OnDuration corresponding to the WUS.

18 Claims, 5 Drawing Sheets

(51) Int. Cl.
*H04W 52/02* (2009.01)
*H04W 68/00* (2009.01)
*H04W 72/0446* (2023.01)
*H04W 72/23* (2023.01)

(56) References Cited

U.S. PATENT DOCUMENTS

2020/0351776 A1* 11/2020 Sarkis ............... H04W 52/0235
2020/0367167 A1* 11/2020 Nam ................. H04W 52/0229
2020/0396685 A1* 12/2020 Nam ................... H04W 72/046

* cited by examiner

WAKE-UP SIGNAL FOR DISCONTINUOUS RECEPTION OPERATIONS

BACKGROUND

A user equipment (UE) may be configured with a discontinuous reception cycle (DRX) includes a scheduled time window during which the UE monitors for network communications. Outside of the scheduled time window, the UE may have the opportunity to sleep and conserve power. Under conventional circumstances, the UE monitors for network communications during the scheduled time window regardless of whether there will actually be any communications for the UE. This is an inefficient use of the UE's limited power supply. Accordingly, there is a need for a mechanism that mitigates the inefficient power consumption associated with receiving network communications while in the DRX mode.

SUMMARY

Some exemplary embodiments are related to a user equipment (UE) having a transceiver configured to communicate with a base station and a processor communicatively coupled with the transceiver and configured to perform operations. The operations include monitoring a wake up signal (WUS) occasion to determine whether a WUS is received during the WUS occasion, when the WUS is received, determining whether the WUS identifies the UE, when the WUS is received and identifies the UE, monitoring an OnDuration of a Discontinuous Reception (DRX) cycle corresponding to the WUS and when the WUS is not received or the WUS does not identify the UE, remaining in a sleep state during the OnDuration corresponding to the WUS.

Other exemplary embodiments are related to a processor configured to perform operations. The operations include monitoring a wake up signal (WUS) occasion to determine whether a WUS is received during the WUS occasion, when the WUS is received, determining whether the WUS identifies a user equipment (UE) comprising the processor, when the WUS is received and identifies the UE, monitoring an OnDuration of a Discontinuous Reception (DRX) cycle corresponding to the WUS and when the WUS is not received or the WUS does not identify the UE, remaining in a sleep state during the OnDuration corresponding to the WUS.

Still further exemplary embodiments are related to a processor configured to perform operations. The operations include determining whether a user equipment (UE) is to wake up for an OnDuration of a Discontinuous Reception (DRX) cycle, when the UE is to wake up, transmitting, to the UE, a wake up signal (WUS) during a (WUS) occasion corresponding to the OnDuration and when the UE is not to wake up, omitting transmitting the WUS during the WUS occasion corresponding to the OnDuration.

DETAILED DESCRIPTION

The exemplary embodiments may be further understood with reference to the following description and the related appended drawings, wherein like elements are provided with the same reference numerals. The exemplary embodiments relate to using wake-up signaling between a network and a user equipment (UE).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to the network being a fifth generation (5G) New Radio (NR) network. The 5G NR network and the UE may utilize a Discontinuous Reception (DRX) cycle that incorporates a wake-up signal (WUS). However, any reference to the 5G NR network or a WUS are merely provided for illustrative purposes. The exemplary embodiments may apply to any type of network that utilizes wake-up signaling in conjunction with any appropriate type of power saving cycle.

When the UE is in a Radio Resource Control (RRC) idle state or an RRC inactive state, the UE may be configured with a DRX cycle. Those skilled in the art will understand that the DRX cycle refers to power saving mechanisms that includes utilizing an active mode of data exchange processing and a sleep mode of inactivity. The UE may use the active mode of processing at defined intervals to perform scheduled operations such as performing measurements related to the network conditions, transmitting (e.g., requests, measurement reports, uplink data etc.), and receiving (e.g. control channel information, reference signals, synchronization signals, downlink data, etc.). The time period that the UE may be scheduled to receive control channel information may be termed the OnDuration. The OnDuration relates to a duration over which the UE may perform operations that enable the UE to receive data that may be transmitted to the UE such as but not limited to, control channel information, an uplink grant, a downlink grant, reference signals, synchronization signals, payload data, paging information, etc. During a DRX cycle, when an OnDuration is not scheduled the UE may have an opportunity to utilize the sleep mode of inactivity and conserve power.

A DRX cycle may have a predetermined duration N such as 100 milliseconds (ms), 50 ms, 40 ms, 20 ms, etc. For example, at a time 0, there may be a OnDuration during which the active mode of processing is used. Subsequently, upon the conclusion of the OnDuration, the UE has an opportunity to utilize the sleep mode of inactivity. Then at a time N, there may be another OnDuration. Subsequently, the sleep mode is used until a time 2N. This process continues for the duration of the cycle. Reference to the sleep mode of inactivity does not necessarily mean putting the processor, the transmitter, and the receiver of the UE to sleep, in hibernation, or in deactivation. For example, the processor (e.g., baseband and/or application) may continue to execute other applications or processes. The sleep mode relates to conserving power by discontinuing a continuous processing functionality relating to operations that enable the UE to receive data that may be transmitted to the UE and transmit data to the network. Reference to the term to DRX cycle is for illustrative purposes, different networks may refer to similar concepts by a different name. Further, reference to the cycles being configured in ms units is merely for illustrative purposes, the exemplary embodiments may utilize a DRX cycle that is based on subframes or any other suitable unit of time.

Under conventional circumstances, the UE may wakeup during one or more OnDurations regardless of whether the network is going to send information to the UE during the OnDuration. However, utilizing an active mode of data exchange processing during an OnDuration that does not include any network communications for the UE is an inefficient use of the UE's limited power supply. As will be described below, the exemplary embodiments may allow the UE to omit utilizing the active mode of data exchange processing during an OnDuration if there is no network communications intended for the UE during the OnDuration. The exemplary embodiments relate to utilizing wake-up signaling between the UE and the network during a DRX cycle. Throughout this description, the term "wake-up signal" or "WUS" may refer to a signal transmitted by the network to the UE that includes information regarding a subsequent time window during which the UE is to monitor for network communications. The WUS may allow the UE to mitigate the inefficient power consumption associated with conventional DRX cycles.

However, because the UE may remain in the sleep state for a longer period, e.g., not wake up for certain OnDurations, when the UE wakes up and enters the active mode of data exchange processing, the UE may experience a frequency and/or timing error. This may have a negative impact on the processing of subsequent control information and/or data. Thus, the exemplary embodiments also relate to operations to account for the potential frequency and/or timing errors that the UE may experience when waking up.

Figure 1:
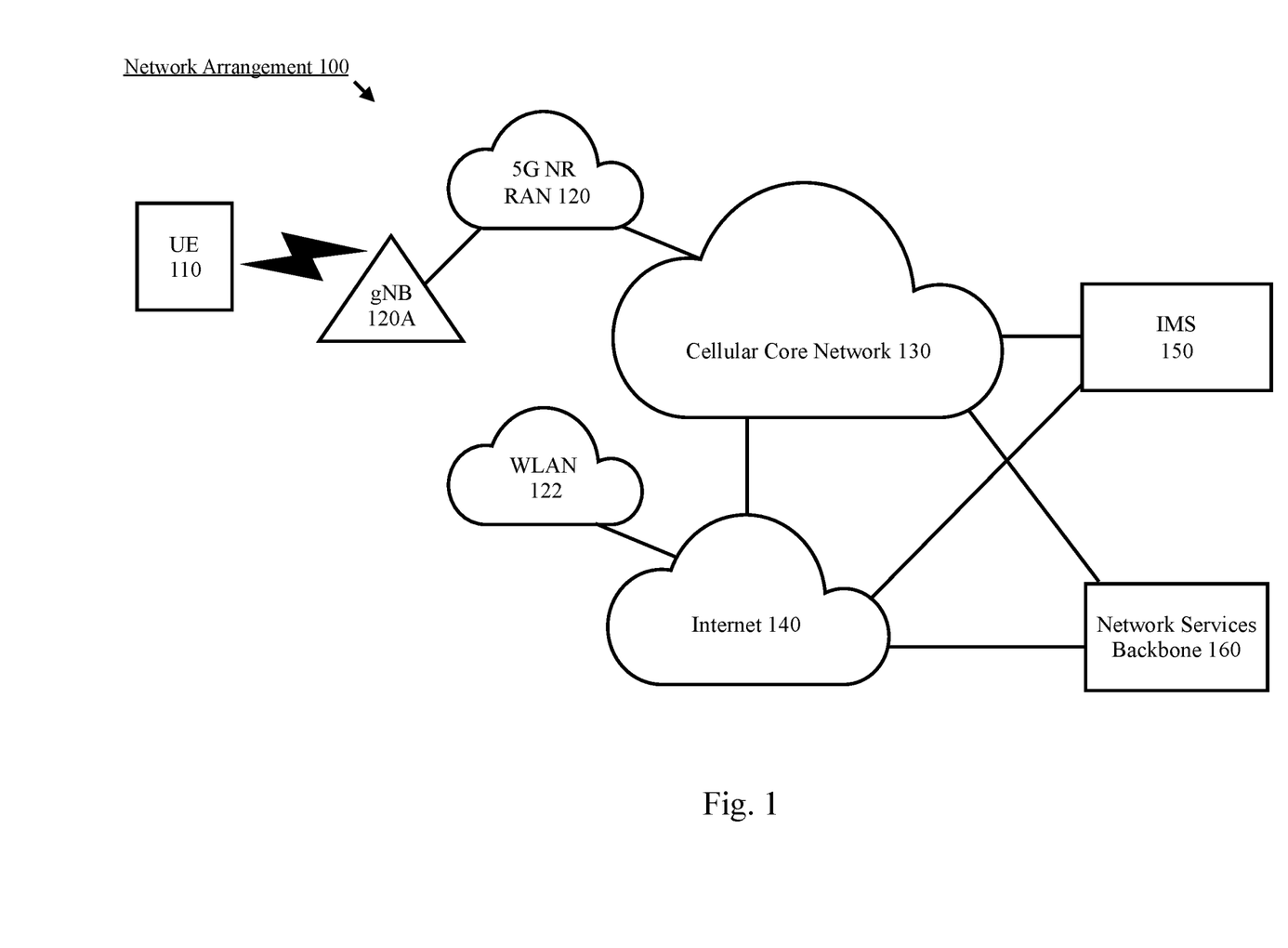
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120 and a WLAN 122. However, it should be understood that the UE 110 may also communicate with other types of networks (e.g. 5G cloud RAN, LTE-RAN, legacy cellular network, etc.) and the UE 110 may also communicate with networks over a wired connection. With regard to the exemplary embodiments, the UE 110 may establish a connection with the 5G NR RAN 120 and/or the WLAN 122. Therefore, the UE 110 may have a 5G NR chipset to communicate with the NG-RAN 120 and an ISM chipset to communicate with the WLAN 122.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The base station (e.g., the gNB 120A) may include one or more communication interfaces to exchange data and/or information with camped UEs, the corresponding RAN, the cellular core network 130, the internet 140, etc. Further, the base station may include a processor configured to perform various operations. For example, the processor of the base station may be configured to perform operations related to the exemplary wake-up signaling described herein. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A). As mentioned above, the use of the 5G NR RAN 120 is for illustrative purposes and any type of network may be used. For example, the UE 110 may also connect to the LTE-RAN (not pictured) or the legacy RAN (not pictured).

In addition to the networks 120 and 122 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
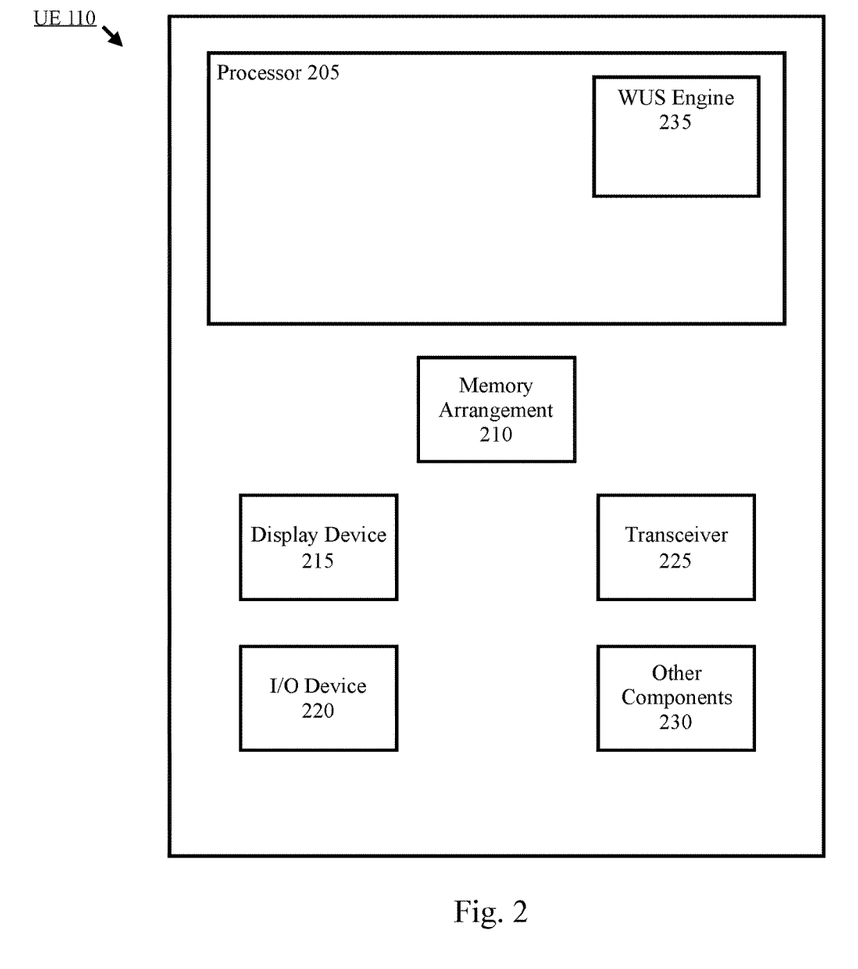
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a WUS engine 235. The WUS engine 235 may be configured to perform operations associated with detecting a WUS and determining the contents of the WUS. The WUS engine 235 may be further configured to control the behavior of the UE 110 in response to receiving a WUS.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

When connected to the network, the UE 110 may be configured to be in one of a plurality of different operating states. One operating state may be characterized as RRC idle state and another operating state may be characterized as RRC connected state. RRC refers to the radio resource control (RRC) protocols. Those skilled in the art will understand that when the UE 110 is in an RRC connected state, the UE 110 and the network may be configured to exchange information and/or data. The exchange of information and/or data may allow the UE 110 to perform functionalities available via the network connection. Further, those skilled in the art will understand that when the UE 110 is connected to the network and in RRC idle state the UE 110 is generally not exchanging data with the network and radio resources are not being assigned to the UE 110 within the network. However, when the UE 110 is in RRC idle state, the UE 110 may monitor for information and/or data transmitted by the network (e.g., WUS, paging, etc.).

Another operating state may be characterized as RRC inactive state. In RRC inactive state, the UE 110 maintains an RRC connection while minimizing signaling and power consumption. Similar to RRC idle state, when the UE 110 is connected to the network and in RRC inactive state the UE 110 is generally not exchanging data with the network. When the UE 110 is in RRC inactive state, the UE 110 may still monitor for information and/or data transmitted by the network (e.g., WUS, paging, etc.). However, any reference to RRC connected state, RRC idle state and RRC inactive state is merely provided for illustrative purposes, the exemplary embodiments may apply to any suitable operating state for the UE 110.

When the UE 110 is camped on a cell and in an RRC idle state or an RRC inactive state, the UE 110 may not be able to exchange data with the network. To exchange data with the network the UE 110 may transition from the RRC idle state to the RRC connected state. For example, while in RRC idle state or inactive state the UE 110 may listen for information such as but not limited to, primary synchronization signals (PSS) and secondary synchronization signals (SSS), Master Information Block (MIB), broadcast messages, System Information Block (SIB), WUS, paging messages, etc. In response, the UE 110 may issue a request to the network that indicates that the UE 110 wants to be moved to the RRC connected state. A successful transition from the RRC idle state or RRC inactive state to RRC connected state may include the exchange of messages between the UE 110 and the cell of the network. In the RRC connected state, a network context may be established between the cell of first network and the UE 110. Thus, the UE 110 may be assigned radio resources and the UE 110 may be able to exchange data with the network.

When in RRC idle state or RRC inactive state, the UE 110 may be configured with a DRX cycle. As indicated above, the DRX cycle may include an OnDuration during which the UE 110 may monitor for network communications. The exemplary embodiments reduce the power consumption associated with waking up by implementing wake-up signaling that may be used to control UE 110 monitoring behavior.

Figure 3:
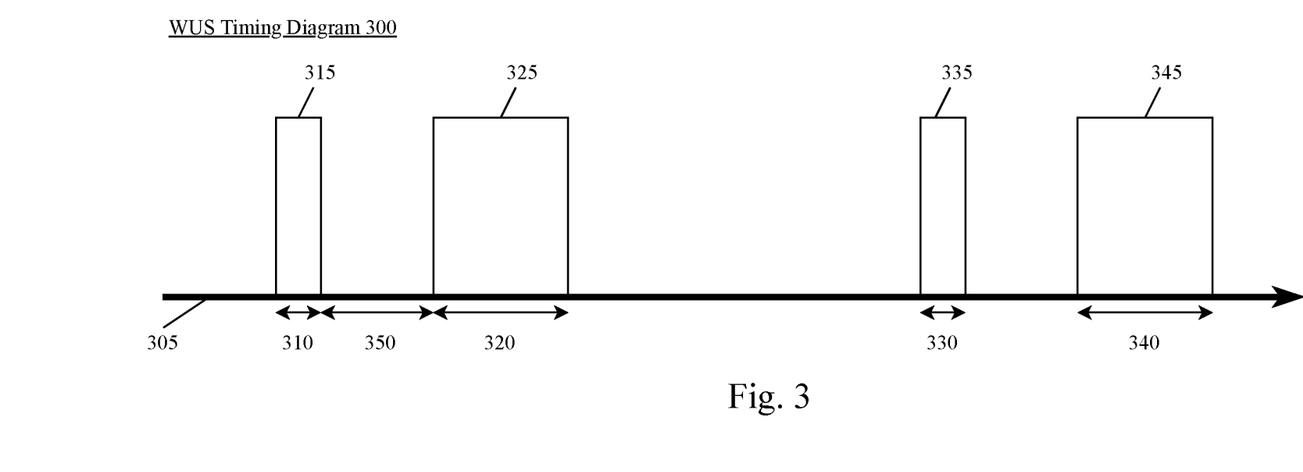
FIG. 3 shows an exemplary timing diagram for a DRX cycle including WUS occasions according to various exemplary embodiments.

FIG. 3 shows an exemplary timing diagram 300 for a DRX cycle including WUS occasions according to various exemplary embodiments. FIG. 3 will be described with regard to the network arrangement 100 of FIG. 1 and the UE 110 of FIG. 2. The timing diagram 300 provides a general overview of how wake-up signaling may be used in conjunction with a DRX cycle.

The timing diagram 300 includes a line 305 that represents time. Initially, consider a scenario in which the UE 110 is camped on the gNB 120A and operating in an RRC idle state or RRC inactive state. In a first DRX cycle, a WUS occasion 315 is scheduled during a time duration 310. The UE 110 is configured to monitor for a WUS during the WUS occasion 315. The WUS occasion 315 corresponds to an OnDuration 325 that occurs during a time duration 320. The network may transmit a WUS during the WUS occasion 315. In this example, it may be considered that the network does not transmit a WUS during the WUS occasion 315. This means that the network does not have any communications for the UE 110 during the corresponding OnDuration 325. Thus, the UE 110, after monitoring for the WUS in the WUS occasion 315 may return to a sleep state and remain asleep for the corresponding OnDuration 325.

While the size of the WUS occasion 315 and the OnDuration 325 in FIG. 3 are not meant to convey any specific time durations, the sizes are meant to convey that the time duration 310 for the WUS occasion 315 is much less than the time duration 320 for the OnDuration 325. Thus, while the UE 110 will wake up to listen for the WUS during the WUS occasion 315, the amount of time it will be awake is much shorter than staying awake for the time duration 320 of the OnDuration 325 when there is no network communications destined for the UE 110.

In a second DRX cycle, a WUS occasion 335 is scheduled during a time duration 330. The UE 110 is configured to monitor for a WUS during the WUS occasion 335. The WUS occasion 335 corresponds to an OnDuration 345 that occurs during a time duration 340. The network may transmit a WUS during the WUS occasion 335. In this example, it may be considered that the network transmits a WUS during the WUS occasion 335. This means there will be network communications during the OnDuration 345 and the UE 110 should be awake during the OnDuration 345 to receive the network communications and perform corresponding operations. Thus, from the two DRX cycles shown in FIG. 3, it can be seen that use of the WUS may allow the UE 110 to remain in the sleep state for a longer period of time during the DRX cycle, e.g., during OnDurations where there are no network communications scheduled for the UE 110.

In some exemplary embodiments, the UE 110 may skip multiple OnDurations based on the lack of a WUS in a single WUS occasion. For example, the UE 110 may be configured such that a WUS occasion corresponds to more than one OnDuration. When configured in this manner, when the UE 110 does not receive a WUS during the WUS occasion, the UE 110 may stay asleep for all the corresponding OnDurations.

Figure 4:
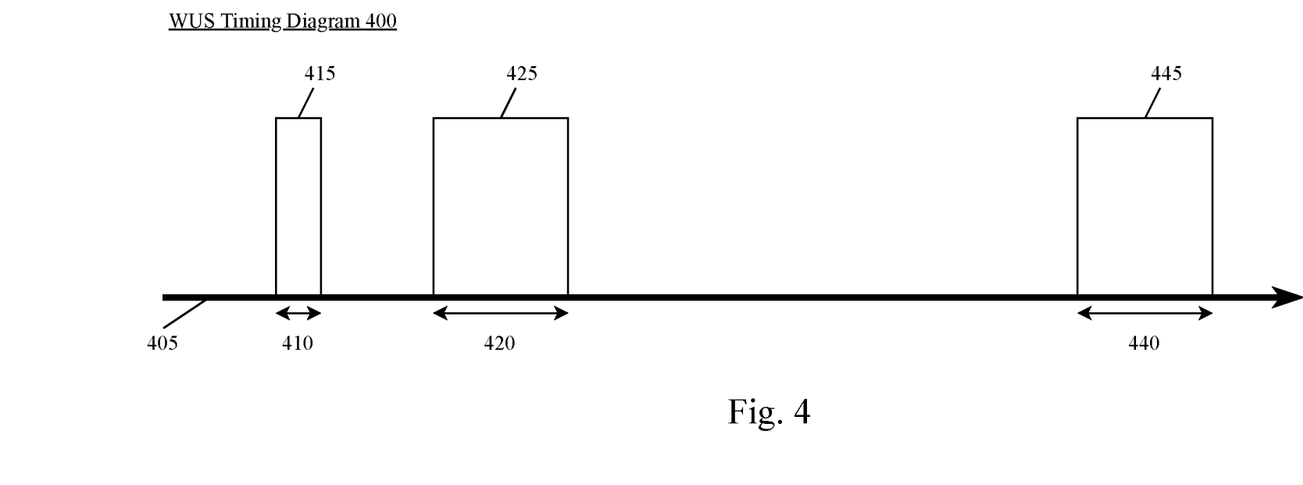
FIG. 4 shows an exemplary timing diagram for a DRX cycle including WUS occasions corresponding to multiple OnDurations according to various exemplary embodiments.

FIG. 4 shows an exemplary timing diagram 400 for a DRX cycle including WUS occasions corresponding to multiple OnDurations according to various exemplary embodiments. The timing diagram 400 includes a line 405 that represents time. Initially, consider a scenario in which the UE 110 is camped on the gNB 120A and operating in an RRC idle state or RRC inactive state. A WUS occasion 415 is scheduled during a time duration 410. The UE 110 is configured to monitor for a WUS during the WUS occasion 415. In this example, the WUS occasion 415 corresponds to an OnDuration 425 that occurs during a time duration 420 and an OnDuration 445 that occurs during a time duration 440. In this example, it may be considered that the network does not transmit a WUS during the WUS occasion 415. This means that the network does not have any communications for the UE 110 during the corresponding OnDuration 425 or the OnDuration 445. Thus, the UE 110, after monitoring for the WUS in the WUS occasion 415 may return to a sleep state and remain asleep for the corresponding OnDuration 425 and the OnDuration 445. In this example, because the WUS occasion 415 corresponds to both the OnDuration 425 and the OnDuration 445, there may not be a WUS occasion between the OnDuration 425 and the OnDuration 445, e.g., similar to the WUS occasion 335 of FIG. 3.

When the UE 110 wakes up for the OnDuration because the UE 110 detected a corresponding WUS, e.g., the onDuration 345 of FIG. 3, the UE 110 may perform various operations during the OnDuration. These operations may include, for example, decoding paging DCI, performing camping cell quality measurements, performing neighboring cell quality measurements, performing inter-frequency measurement, etc. As described above, the network will transmit a WUS when there are communications for the UE 110 in the corresponding OnDuration. Based on the above described examples, it should be understood that the general term network communications may include operations such as receiving transmissions specifically destined for the UE 110, receiving general transmissions from the network, performing measurements, transmitting data to the network, etc.

As described above, the UE 110 may be configured to monitor the WUS occasions. In some exemplary embodiments, configuring the UE 110 to monitor WUS occasions may include providing the UE 110 with an offset. The offset indicates when, in relation to the OnDuration, the corresponding WUS occasion will occur. For example, referring to FIG. 3, the time duration 350 may be the configured offset in this example, e.g., the UE 110 expects the WUS occasion 315 to occur the offset time duration 350 before the OnDuration. The offset may be configured, for example, via a system information block (SIB) transmitted by the network, via RRC signaling between the UE 110 and the network, etc. The offset may be configured in terms of time (e.g., milliseconds) or in units of slots, symbols, etc. In some exemplary embodiments, the UE 110 may report a preferred WUS offset to the network after RRC connection setup.

With respect to the WUS design, in some exemplary embodiments, the WUS may be encoded by a polar error correction code. In some exemplary embodiments, the WUS may be encoded as a Cyclic Redundancy Check (CRC) error detection code that is scrambled by a Radio Network Temporary Identifier (RNTI). The RNTI may be for example, a paging RNTI (P-RNTI). In another example, a new RNTI may be configured that may be the same for a group of UEs. This new RNTI may be configured by RRC signaling, a SIB, or a hash function based on UE ID such as a Temporary Mobile Subscriber Identification (TMSI) or International Mobile Subscriber Identification (IMSI). This type of WUS may be similar to Downlink Control Information (DCI).

In some exemplary embodiments, the WUS may include group information. For example, all the UEs configured to wake up during the same DRX cycle can be divided into N groups. An N bit bitmap in the WUS may be used to indicate which group of UEs is to wake up for a DRX cycle. In the examples above, it was stated that the UE 110 would not wake up if a WUS was not detected during a WUS occasion. However, this example should make it clear that a WUS may be received by the UE 110 during a WUS occasion, but the WUS may include information that indicates the WUS is not meant for the UE 110, e.g., the WUS includes the group information and the UE 110 is not part of the identified group. Thus, this example shows that either the absence of a WUS or a WUS that is not intended for a particular UE, may be used to indicate to the UE that the UE does not need to wake up during a particular OnDuration.

In some exemplary embodiments, the WUS may also include a location/triggering of a reference signal that may be used by the UE 110 for timing and frequency tracking. This timing and frequency tracking will be described in greater detail below with respect to FIG. 6.

In some exemplary embodiments, the WUS may be designed based on a sequence detection. For example, there may be a single sequence, e.g., the UE 110 is assigned a single sequence, and if the UE detects the corresponding sequence assigned to itself, the UE performs wake up, otherwise, the UE skips the corresponding OnDuration. In another example, the WUS may have a one-to-one mapping with P-RNTI. As those skilled in the art understand, multiple UEs may share a P-RNTI. Thus, if the UEs that share the P-RNTI detect the P-RNTI in the WUS, the UEs perform wake up, otherwise, the UEs skip the corresponding OnDuration. In a still further example, the group of UEs that share the same P-RNTI may be divided further into N groups, where each group has its own sequence. In this example, the WUS may include the P-RNTI and the sequence to indicate which of the UEs that share the P-RNTI should wake up.

Figure 5A:
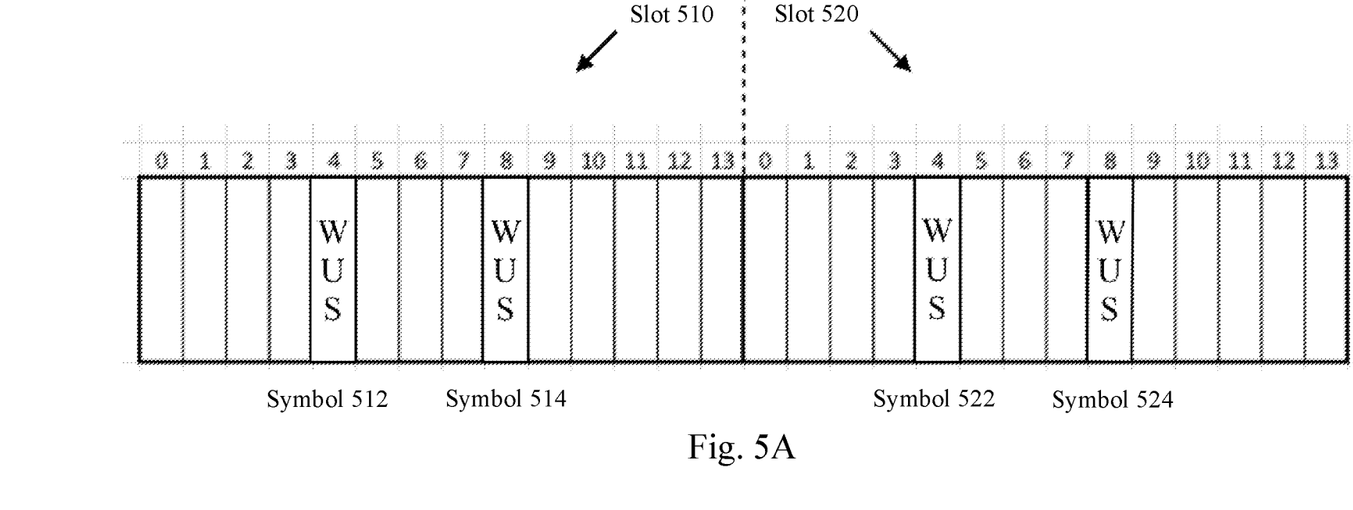
FIG. 5A shows an example of a wake up signal (WUS) that spans multiple slots according to various exemplary embodiments.
Figure 5B:
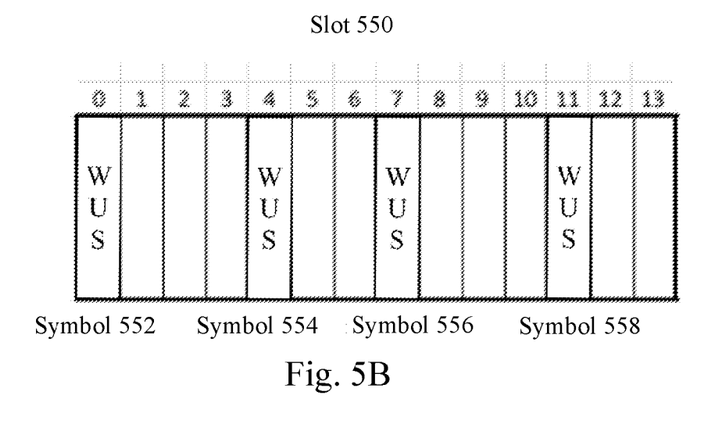
FIG. 5B shows an example of a WUS configured within a single slot according to various exemplary embodiments.

When the WUS is designed based on sequence detection, the design may be used to facilitate time and frequency tracking. For example, the WUS may represent multiple symbols carried in one or more slots. There are a variety of different combinations of symbols and slots that may be used for a WUS. FIGS. 5A and 5B each provide an example of a WUS configuration. However, any reference to a WUS being configured with a particular number of symbols or a particular number of slots is merely provided for illustrative purposes. The exemplary embodiments are not limited to any particular WUS configuration.

In the frequency domain, the WUS may include a wideband transmission, e.g., at least 52 Physical Resource Blocks (PRBs), for frequency and timing tracking. In the time domain, various designs may be used, for example, a fixed number of symbols between two WUS symbols, multiple WUS symbols in a slot, multiple slots of WUS symbols, with or without the same pattern, etc. Examples of WUS configurations are provided below with respect to FIGS. 5A and 5B.

FIG. 5A shows an example of a WUS that spans multiple slots. In this example, a first slot 510 includes two WUS symbols 512, 514 with three symbols in between the two WUS symbols 512, 514. This WUS also includes a second adjacent slot 320 that also includes two WUS symbols 522, 524 with three symbols in between the two WUS symbols 522, 524.

FIG. 5B shows an example of a WUS configured within a single slot. In this example, slot 550 is configured to include four WUS symbols 552-558 with two or three symbols in between each of the WUS symbols 552-558. Although not shown in FIG. 5B, in some WUS configurations, there may be three symbols in between a first WUS symbol and a third WUS symbol within the same slot. Compared to FIG. 5A, the WUS configuration shown in FIG. 5B provides more WUS symbols in the same slot. This WUS configuration may provide more power saving benefits to the UE 110 because there are less slots and symbols for the UE 110 to process. As mentioned above, the exemplary embodiments are not limited to a particular WUS configuration.

Thus, because the UE 110 understands the time and/or frequency pattern of the WUS, the UE 110 may use the detected WUS to perform timing and/or frequency tracking for the gNB 120A that transmitted the WUS. In this example, detecting the WUS and performing the corresponding timing and/or frequency tracking may allow the UE 110 to be better aligned with the gNB 120A when the UE 110 wakes up for the corresponding OnDuration.

In some exemplary embodiments, a WUS may be used to trigger a Tracking Reference Signal (TRS) before the DRX cycle. The TRS may refer to a downlink reference signal that is configured to be used by the UE 110 for timing and/or frequency tracking. Thus, unlike the example above, the WUS is not used for timing and/or frequency tracking. Rather, the WUS may trigger a separate reference signal that the UE 110 may use for timing and/or frequency tracking.

Figure 6:
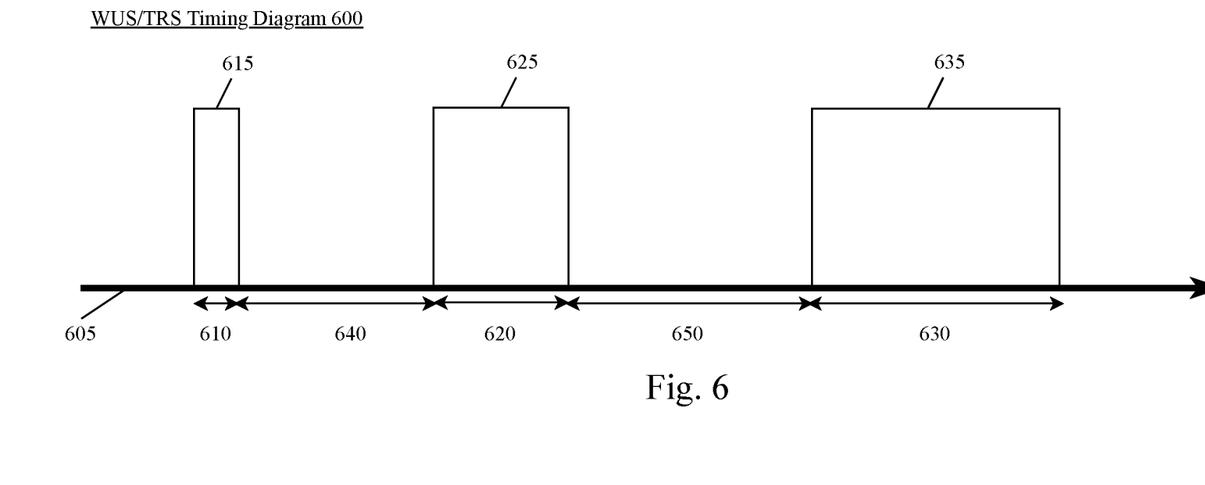
FIG. 6 shows an exemplary timing diagram for a DRX cycle including a WUS that triggers a Tracking Reference Signal (TRS) according to various exemplary embodiments.

FIG. 6 shows an exemplary timing diagram 600 for a DRX cycle including a WUS that triggers a TRS according to various exemplary embodiments. The timing diagram 600 includes a line 605 that represents time. Initially, consider a scenario in which the UE 110 is camped on the gNB 120A and operating in an RRC idle state or RRC inactive state. In a DRX cycle, a WUS occasion 615 is scheduled during a time duration 610. The UE 110 is configured to monitor for a WUS during the WUS occasion 615. The WUS occasion 615 corresponds to an OnDuration 635 that occurs during a time duration 630. The network may transmit a WUS during the WUS occasion 615. In this example, it may be considered that the network transmits a WUS during the WUS occasion 615. This means that the network has communications for the UE 110 during the corresponding OnDuration 635.

The WUS received in WUS occasion 615 may also trigger a TRS 625 during the time duration 620. Thus, the UE 110, after monitoring for the WUS in the WUS occasion 615 will also wake up to monitor for the TRS 625 during the time duration 620. The UE 110 may receive the TRS 625 and then use the TRS to acquire frequency and/or timing estimations for the gNB 120A. The UE 110 may then wake up for the OnDuration 635 and perform operations during the OnDuration 635 with improved frequency and/or timing with the gNB 120A based on the TRS.

The network may configure a TRS timing offset 640 between the WUS 615 and the TRS 625 so that the UE 110 has enough time to detect/decode the WUS before the UE 110 receives the TRS. The TRS offset may be configured, for example, a SIB or may be defined by standards (e.g., 3GPP Standards). In some exemplary embodiments, the UE may report the minimum TRS offset. Similarly, the network may also configure a DRX timing offset 650 between the TRS 625 and the OnDuration 635 so that the UE 110 has enough time to perform accurate timing and frequency tracking. Again, the UE 110 may report the minimum DRX timing offset or it may be defined by standards.

As described above, when the UE 110 sleeps for a long period of time, the UE may experience a frequency and/or timing error. This may have a negative impact on the processing of subsequent control information and/or data. Some examples of handling these frequency and/or timing errors were described above, e.g., using the WUS or the TRS for frequency and/or timing tracking.

The following describes additional exemplary embodiments for handling these frequency and/or timing errors. In these examples, it may be considered that the UE 110 received a WUS during a WUS occasion and is waking up for the corresponding OnDuration.

Figure 7:
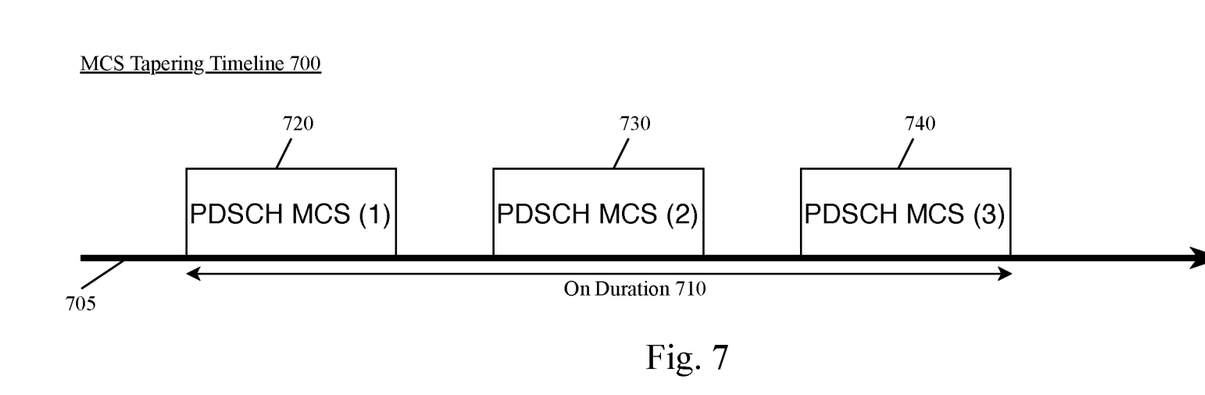
FIG. 7 shows an exemplary timeline for tapering the Modulation and Coding Scheme (MCS) during an OnDuration according to various exemplary embodiments.

In some exemplary embodiments, a modulation and coding scheme (MCS) during the OnDuration for a scheduled Physical Downlink Shared Channel (PDSCH) may be tapered. FIG. 7 shows an exemplary timeline 700 for tapering the MCS during an OnDuration according to various exemplary embodiments. FIG. 7 shows a line 705 representing time that includes an OnDuration 710. As shown in FIG. 7, the OnDuration 710 may include three MCS for the PDSCH, MCS(1) 720, MCS(2) 730 and MCS(3) 740. The characteristics of MCS(1) 720, MCS(2) 730 and MCS(3) 740 will be described in greater detail below. Thus, during the OnDuration 710, the gNB 120A may schedule PDSCH data for the UE 110. The gNB 120A may encode the PDSCH data using MCS(1) 720 for the corresponding time duration as shown in FIG. 7. The gNB 120A may then encode the PDSCH data using MCS(2) 730 for the corresponding time duration as shown in FIG. 7. Finally, the gNB 120A may encode the PDSCH data using MCS(3) 730 for the corresponding time duration as shown in FIG. 7. Correspondingly, the UE 110 may be configured to decode the PDSCH data using the appropriate MCS.

In this example, it may be considered that the MCS(1) 720 is a more robust coding (e.g., lower coding rate and/or lower modulation order) than MCS(2) 730 that is a more robust coding than MCS(3) 740. As those skilled in the art will understand, the lower coding rate and/or lower modulation order generally means that the UE 110 is more likely to successfully decode the encoded data. The lower coding rate and/or lower modulation order results in a lower throughput than a lower coding rate. Thus, the purpose of initially having the lower coding rate and/or lower modulation order is so that if there is a large frequency and/or timing error because of the long sleep cycle for the UE 110, the UE 110, while having a lower throughput, is more likely to successfully decode the data received on the PDSCH. As more data is received and the frequency and/or timing errors are resolved, the MCS may be increased (e.g., higher coding rate and/or higher modulation order) resulting in a higher throughput. This is the scheme illustrated in FIG. 7 with the three (3) MCS. The exemplary embodiments are not limited to three levels of MCS as the taper may have any number of MCS levels of 2 or greater.

A maximum MCS that can be decoded by the UE 110 may be reported as a UE capability. For example, a basic report may include a single MCS. An advanced report may include a sequence of MCS, e.g., the sequence MCS(1) 720, MCS(2) 730, MCS(3) 740 as shown in FIG. 7 as time progresses. As described above, the maximum MCS decodable by the UE 110 may increase as the UE 110 has more accurate timing and frequency tracking. The UE 110 may update the UE capability via, for example, RRC signaling. The capability may be based, in part, on a network configuration such as the periodicity of Synchronization Signal Blocks (SSBs), the availability of TRS, etc. From the example of the TRS, it should be seen that the exemplary embodiments may implement more than one operation to handle the frequency and/or timing errors.

In some exemplary embodiments, a PDSCH repetition may be configured for the PDSCH in Idle mode. The number of repetitions may be configured in, for example, a SIB, RRC configuration signaling before the UE 110 enters inactive or idle mode, etc. The repetitions may follow an inter-slot repetition scheme, e.g., the same time and frequency domain resource allocation may be repeated N times in N consecutive slots. The redundancy version (RV) used for each repetition may be defined by standards (e.g., 3GPP standards), configured by a SIB or via RRC signaling.

In some exemplary embodiments, when one of the repetitions collides with uplink (UL) symbols, the transmission of the corresponding PDSCH is omitted. In other exemplary embodiments, when one of the repetitions collides with uplink (UL) symbols, the transmission of the corresponding PDSCH is postponed to the next valid slot that does not collide with the UL symbols.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
a transceiver configured to communicate with a base station; and
a processor communicatively coupled with the transceiver and configured to perform operations comprising:
monitoring a wake up signal (WUS) occasion to determine whether a WUS is received during the WUS occasion;
when the WUS is received, determining whether the WUS identifies the UE;
when the WUS is received and identifies the UE, monitoring an OnDuration of a Discontinuous Reception (DRX) cycle corresponding to the WUS, wherein the WUS includes information identifying a tracking reference signal (TRS) is to be transmitted by the base station including a time and frequency location of the TRS, the operations further comprising:
monitoring the time and frequency location for the TRS; and
performing one of time or frequency tracking based on the TRS; and
when the WUS is not received or the WUS does not identify the UE, remaining in a sleep state during the OnDuration corresponding to the WUS.

2. The UE of claim 1, wherein the WUS corresponds to more than one OnDuration.

3. The UE of claim 1, wherein monitoring the OnDuration comprises one of decoding paging Downlink Control Information (DCI), performing camping cell quality measurements, performing neighboring cell quality measurements, or performing inter-frequency measurements.

4. The UE of claim 1, wherein the operations further comprise:
receiving a timing offset value indicating a time between the WUS and the corresponding OnDuration.

5. The UE of claim 1, wherein the WUS is encoded with a Cyclic Redundancy Check (CRC) error detection code that is scrambled by a Radio Network Temporary Identifier (RNTI).

6. The UE of claim 5, wherein the encoded WUS identifies the UE based on at least a bitmap indicating a UE group to which the UE belongs.

7. The UE of claim 1, wherein the WUS identifies the UE based on at least one of (i) a sequence corresponding to the UE, (ii) a paging Radio Network Temporary Identification (P-RNTI) corresponding to the UE or (iii) the P-RNTI and a further sequence comprising an identification of a group that includes the UE.

8. The UE of claim 1, wherein the WUS comprises one of (i) more than two WUS symbols in a single slot (ii) two WUS symbols in a single slot with a fixed number of non-WUS symbols between the two WUS symbols, or (iii) WUS symbols in multiple slots, each slot have a same WUS symbol pattern.

9. The UE of claim 1, wherein the operations further comprise:
monitoring a Physical Downlink Shared Channel (PDSCH) during a first portion of the OnDuration;
decoding data received on the PDSCH during the first portion of the OnDuration based on, at least, a first Modulation and Coding Scheme (MCS);
monitoring the PDSCH during a second portion of the OnDuration; and
decoding data received on the PDSCH during the second portion of the OnDuration based on, at least, a second MCS, wherein the first MCS includes a lower coding rate or a lower modulation order than the second MCS.

10. A processor configured to perform operations comprising:
monitoring a wake up signal (WUS) occasion to determine whether a WUS is received during the WUS occasion;
when the WUS is received, determining whether the WUS identifies a user equipment (UE) comprising the processor;
when the WUS is received and identifies the UE, monitoring an OnDuration of a Discontinuous Reception (DRX) cycle corresponding to the WUS, wherein the WUS includes information identifying a tracking reference signal (TRS) is to be transmitted by the base station including a time and frequency location of the TRS, the operations further comprising:
monitoring the time and frequency location for the TRS; and
performing one of time or frequency tracking based on the TRS; and
when the WUS is not received or the WUS does not identify the UE, remaining in a sleep state during the OnDuration corresponding to the WUS.

11. The processor of claim 10, wherein monitoring the OnDuration comprises one of decoding paging Downlink Control Information (DCI), performing camping cell quality measurements, performing neighboring cell quality measurements or performing inter-frequency measurements.

12. The processor of claim 10, wherein the WUS is encoded with a Cyclic Redundancy Check (CRC) error detection code that is scrambled by a Radio Network Temporary Identifier (RNTI), wherein the encoded WUS identifies the UE based on at least a bitmap indicating a UE group to which the UE belongs.

13. The processor of claim 10, wherein the WUS identifies the UE based on at least one of (i) a sequence corresponding to the UE, (ii) a paging Radio Network Temporary Identification (P-RNTI) corresponding to the UE or (iii) the P-RNTI and a further sequence comprising an identification of a group that includes the UE.

14. A processor configured to perform operations comprising:
determining whether a user equipment (UE) is to wake up for an OnDuration of a Discontinuous Reception (DRX) cycle;
when the UE is to wake up, transmitting, to the UE, a wake up signal (WUS) during a (WUS) occasion corresponding to the OnDuration, wherein the operations further comprise:
encoding the WUS to include information identifying a tracking reference signal (TRS) including timing and frequency information for the TRS; and
transmitting the TRS based on the timing and frequency information, wherein the TRS is transmitted a predefined offset from both the WUS and the OnDuration; and
when the UE is not to wake up, omitting transmitting the WUS during the WUS occasion corresponding to the OnDuration.

15. The processor of claim 14, wherein the WUS is transmitted a predefined timing offset value before a start of the corresponding OnDuration.

16. The processor of claim 14, wherein the operations further comprise one of:
encoding the WUS as a Cyclic Redundancy Check (CRC) error detection code that is scrambled by a Radio Network Temporary Identifier (RNTI); and
encoding, after the CRC coding, the WUS using a polar error correction code.

17. The processor of claim 14, wherein the operations further comprise one of:
encoding the WUS to include a sequence corresponding to the UE;
encoding the WUS to include a paging Radio Network Temporary Identification (P-RNTI) corresponding to the UE; or
encoding the WUS to include the P-RNTI and a further sequence comprising an identification of a group that includes the UE.

18. The processor of claim 14, wherein the operations further comprise one of:
encoding the WUS to include more than two WUS symbols in a single slot; or
encoding the WUS to include two WUS symbols in a single slot with a fixed number of non-WUS symbols between the two WUS symbols.

* * * * *